(12) United States Patent
Carr

(10) Patent No.: US 7,475,402 B1
(45) Date of Patent: Jan. 6, 2009

(54) METHOD AND APPARATUS TO ISOLATE CHANGES IN REMOTING SYSTEM SERVERS

(75) Inventor: Harold Carr, Salt Lake City, UT (US)

(73) Assignee: Sun Microsystems, Inc., Santa Clara, CA (US)

(*) Notice: Subject to any disclaimer, the term of this patent is extended or adjusted under 35 U.S.C. 154(b) by 376 days.

(21) Appl. No.: 10/954,861

(22) Filed: Sep. 30, 2004

Related U.S. Application Data

(63) Continuation-in-part of application No. 10/677,434, filed on Oct. 2, 2003.

(60) Provisional application No. 60/466,623, filed on Apr. 30, 2003.

(51) Int. Cl.
G06F 3/00 (2006.01)
G06F 15/16 (2006.01)

(52) U.S. Cl. .................. 719/313; 709/217; 709/227; 709/231

(58) Field of Classification Search .............. 707/10; 709/201–207, 21–219, 227–229, 231, 236, 709/237; 715/740; 718/104, 106; 719/311–318, 719/328–332
See application file for complete search history.

(56) References Cited

U.S. PATENT DOCUMENTS

| | | | |
|---|---|---|---|
| 6,173,327 B1 * | 1/2001 | De Borst et al. ............ 709/231 |
| 6,272,557 B1 * | 8/2001 | Lim et al. .................... 719/315 |
| 6,282,581 B1 * | 8/2001 | Moore et al. ................ 719/316 |
| 6,351,749 B1 | 2/2002 | Brown et al. |
| 6,418,422 B1 | 7/2002 | Guenther et al. |
| 6,817,009 B2 | 11/2004 | Flanagan et al. |
| 6,820,261 B1 | 11/2004 | Bloch |
| 7,024,460 B2 * | 4/2006 | Koopmas et al. ............ 709/206 |
| 7,028,312 B1 * | 4/2006 | Merrick et al. .............. 719/330 |
| 7,089,567 B2 | 8/2006 | Girardot et al. |
| 7,139,811 B2 | 11/2006 | Lev Ran et al. |

(Continued)

OTHER PUBLICATIONS

Roberto Chinnici, Java™ API for XML-based RPC JAX-RPC 1.1—JSR-101 Java Community Proces (JCP), Sun Microsystems, Apr. 11, 2003, (166 pages).

(Continued)

Primary Examiner—Meng-Ai An
Assistant Examiner—Charles E Anya
(74) Attorney, Agent, or Firm—Robert C. Kowert; Meyertons, Hood, Kivlin, Kowert & Goetzel, P.C.

(57) ABSTRACT

Method and apparatus for dynamically and adaptively alternating encodings, protocols, and/or transports in remoting system servers. Embodiments may provide a mechanism or mechanisms to isolate encoding, protocol, and/or transport changes in remoting system servers. In a remoting system, a server may make its service(s) available via multiple, published encoding, protocol and transport (EPT) combinations. One embodiment may provide a mechanism that enables a remoting system server to determine an EPT combination for receiving messages from a client, to have that choice drive the creation of objects and/or interface instances on the remoting system server used in the message exchange (including, but not limited to, connections, protocol handlers, and decoders), and to switch to a different EPT combination on the remoting system server to receive other messages, if necessary. Embodiments may be used in all types of remoting systems and/or in other computing environments including, but not limited to, peer-to-peer environments.

57 Claims, 7 Drawing Sheets

U.S. PATENT DOCUMENTS

2002/0116454 A1* 8/2002 Dyla et al. ................. 709/203
2002/0120428 A1   8/2002 Christianes
2003/0149741 A1   8/2003 Krooss
2004/0158589 A1   8/2004 Liang et al.
2004/0267933 A1* 12/2004 Przybylski et al. .......... 709/227

OTHER PUBLICATIONS

Bill Venners, "Jini Extensible Remote Invocation—A Conversion with Bob Scheifler, Part VI," Artima Developer, Aug. 12, 2002, (7 pages).

Douglas C. Schmidt, "The Adaptive Communication Environment—An Object Oriented Network Programming Toolkit for Developing Communication Software," http://:www.cs.wustl.edu/~schmidt/, Department of Computer Science, (25 pages).

U.S. Appl. No. 11/117,023, filed Apr. 28, 2005.

U.S. Appl. No. 11/117,267, filed Apr. 28, 2005.

Java To IDL Language Mapping Specification, Version 1.3, Sep. 2003, Object Management Group, http://www/omg.org/docs/formal/03-09-04.pdf.

Domain, et al., "Thread-Local Heaps for Java", IBM Haifa Research Laboratory, Mount Carmel, ACM 2002, pp. 76-87.

* cited by examiner

METHOD AND APPARATUS TO ISOLATE CHANGES IN REMOTING SYSTEM SERVERS

PRIORITY INFORMATION

This application is a continuation-in-part of U.S. patent application Ser. No. 10/677,434, titled "System and Methods Employing a PEPt Architecture for RPC" filed Oct. 2, 2003, whose inventor is Harold Carr, which is hereby incorporated by reference in its entirety, and which claims benefit of priority of provisional application Ser. No. 60/466,623 entitled "System and Methods Employing a PEPt Architecture for RPC" filed Apr. 30, 2003, whose inventor is Harold Carr.

BACKGROUND OF THE INVENTION

1. Field of the Invention

This invention relates to computer software, and more particularly to the server side of remoting systems such as Remote Procedure Call (RPC) and messaging systems.

2. Description of the Related Art

Remoting systems make it easier for programmers to write distributed applications. Some types of remoting systems are RPC, messaging, media streaming and group communication. RPC (or Remote Method Invocation—RMI) systems have a programming model where one invokes a method on a remote object just as one invokes a method on a local object. The details of the communication are handled by the remoting infrastructure. Messaging systems are programmed by adding data to a message structure and then giving that structure to the messaging system infrastructure to send to the receiver. Again, the details are handled by the infrastructure.

There are numerous RPC and messaging systems in existence. For example, Java specifies the RMI, JavaIDL, RMI-IIOP, and JAX-RPC RPC systems, and the JMS and JAXM messaging systems. In Java, to communicate using the WS-I profile, the JAX-RPC programming model is used. To communicate using IIOP, RMI-IIOP is used.

Remoting systems (e.g., RPC and Messaging systems) may need or desire to support alternate encodings, protocols and/or transports (EPTs), either because of evolving standards or through dynamic negotiation with a peer. Users of a remoting system do not want to be concerned with such details nor have to change programming models just to use a different protocol. The users want to concentrate on the data being sent.

Remote Procedure Call (RPC)

Remote Procedure Call (RPC) is a protocol that one program can use to request a service from a program located in another computer in a network without having to understand network details. A procedure call is also sometimes referred to as a function call or a subroutine call. RPC uses the client/server model. The requesting program is a client and the service-providing program is the server. Similar to a regular or local procedure call, an RPC is a synchronous operation requiring the requesting program to be suspended until the results of the remote procedure are returned. However, the use of lightweight processes or threads that share the same address space allows multiple RPCs to be performed concurrently.

When program statements that use RPC are compiled into an executable program, a stub is included in the compiled code that acts as the representative of the remote procedure code. When the program is run and the procedure call is issued, the stub receives the request and forwards it to a client runtime program in the local computer. The client runtime program has the knowledge of how to address the remote computer and server application and sends the message across the network that requests the remote procedure. Similarly, the server includes a runtime program and tie that interface with the remote procedure itself. Results are returned in a similar way.

JAX-RPC (Java API for XML-Based RPC) is an application program interface (API) in the Java Web Services Developer Pack (WSDP) that enables Java developers to include remote procedure calls (RPCs) with Web services or other Web-based applications. JAX-RPC is aimed at making it easier for applications or Web services to call other applications or Web services. JAX-RPC provides a programming model for the development of SOAP (Simple Object Access Protocol)-based applications. The JAX-RPC programming model simplifies development by abstracting SOAP protocol-level runtime mechanisms and providing mapping services between Java and the Web Services Description Language (WSDL).

The specification and implementation of Remote Procedure Call (RPC) systems have retread the same ground in many forms, from DCE, to distributed versions of C++, to COM/DCOM, CORBA, RMI and RMI-IIOP, to the more recent XML-RPC and SOAP. The specification and implementation of these systems seems to traverse the same ground repeatedly.

SUMMARY

Embodiments of a method and apparatus for dynamically and adaptively alternating encodings, protocols, and/or transports in the server side of remoting systems (e.g., Remote Procedure Call (RPC) systems and messaging systems in general) are described. Embodiments may provide a mechanism or mechanisms for encoding, protocol and/or transport extensibility in remoting system servers and to isolate encoding, protocol, and/or transport changes in remoting system servers. One embodiment may provide a mechanism to isolate encoding changes in remoting system servers. The mechanism may enable a message exchange to dynamically change the encoding in use without the need to change other parts of the remoting system client such as presentation, protocols and/or transport. One embodiment may provide a mechanism to isolate protocol changes in remoting system servers. The mechanism may enable a message exchange to dynamically change the protocol in use without the need to change other parts of the remoting system server such as presentation, encoding and/or transport. One embodiment may provide a mechanism to isolate transport changes in remoting system servers. The mechanism may enable a message exchange to dynamically change the transport in use without the need to change other parts of the remoting system server such as presentation, encoding, and/or protocol.

In a remoting system, a server may make its service(s) available via multiple encoding, protocol and transport (EPT) combinations. One embodiment may provide a mechanism that enables a remoting system server to determine an EPT combination for receiving messages from a client, for example to remotely invoke procedures on the server, and for transmitting response messages, if any, from the server to the client, and to have the choice drive the creation of objects and/or interface instances used by the remoting system server in the message exchange.

One embodiment may provide server-side encoding, protocol and transport extensibility for remoting systems through an acceptor mechanism on the server side of the remoting system. Embodiments of an acceptor mechanism may enable support of alternate EPTs on the server side of remoting systems transparent to a programming model. When a message is received on a connection set up by the acceptor, the acceptor acts as a factory for specific decoders, protocol handlers (which may be referred to as MessageDispatchers) and connections. Embodiments of the acceptor mechanism may be used, for example, to adaptively alternate between XML and binary encoding, protocol and transport combinations on a remoting system server. The acceptor mechanism isolates change from the remoting system user while allowing a common remoting infrastructure to be reused.

Embodiments of the server-side mechanism may be used to isolate EPT combination changes on remoting system servers implemented according to various remoting system architectures including, but not limited to, a Presentation, Encoding, Protocol and transport (PEPt) remoting architecture. While embodiments are primarily described herein in the context of RPC and messaging remoting systems, it is important to note that embodiments may be used in all types of remoting systems including, but not limited to, RPC, messaging, media streaming and group communication remoting systems, as well as in other computing environments including, but not limited to, peer-to-peer environments.

Figure 1:
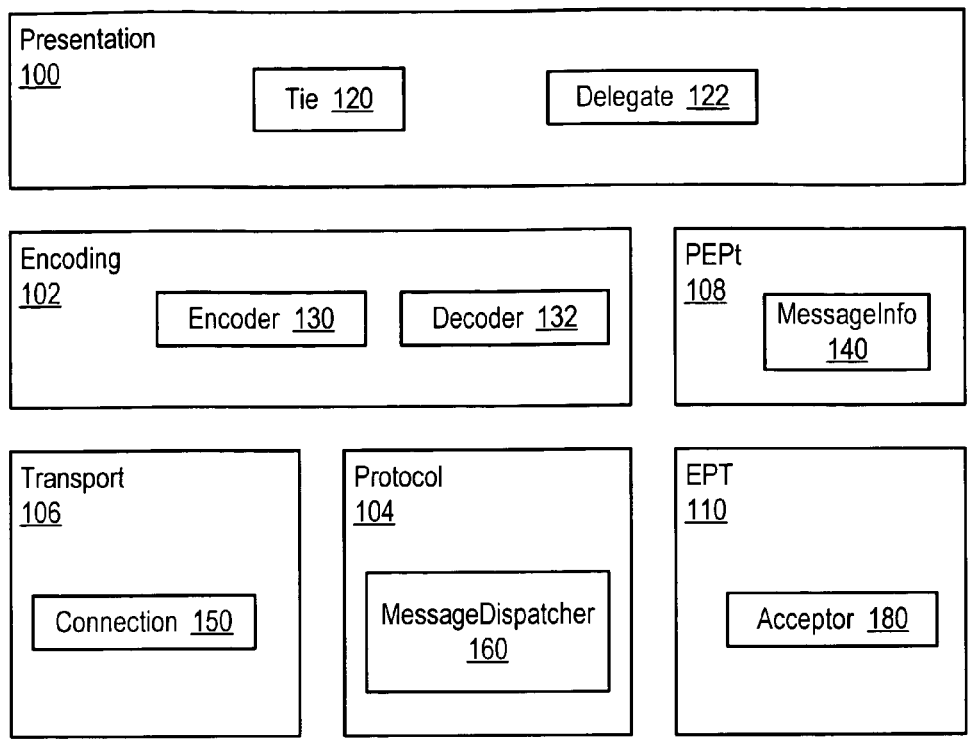
FIG. 1 illustrates a block-level view of an exemplary PEPt server-side architecture including an acceptor mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for dynamically and adaptively alternating encodings, protocols, and/or transports in the server side of remoting systems (e.g., Remote Procedure Call (RPC) systems and messaging systems in general) are described. Embodiments may provide a mechanism or mechanisms for encoding, protocol and/or transport extensibility in remoting system servers and to isolate encoding, protocol, and/or transport changes in remoting system servers. One embodiment may provide a mechanism to isolate encoding changes in remoting system servers. The mechanism may enable a message exchange to dynamically change the encoding in use without the need to change other parts of the remoting system server such as presentation, protocols and/or transport. One embodiment may provide a mechanism to isolate protocol changes in remoting system servers. The mechanism may enable a message exchange to dynamically change the protocol in use without the need to change other parts of the remoting system server such as presentation, encoding and/or transport. One embodiment may provide a mechanism to isolate transport changes in remoting system servers. The mechanism may enable a message exchange to dynamically change the transport in use without the need to change other parts of the remoting system server such as presentation, encoding, and/or protocol.

In a remoting system, a server may make its service(s) available to clients via multiple encoding, protocol and transport (EPT) combinations. One embodiment may provide a mechanism or mechanisms that enables a remoting system server to select an EPT combination for receiving messages from a client to remotely invoke procedures of the server's service(s) and for sending response messages to the client, if necessary, and to have the choice drive the creation of objects and/or interface instances used by the remoting system server in the message exchange. One embodiment may provide server-side (a server is the party or peer receiving and reacting to messages in a remoting system) encoding, protocol and transport extensibility for remoting systems through an acceptor mechanism on the server side of the remoting system. Embodiments of an acceptor mechanism may enable support of alternate EPTs on the server side of remoting systems transparently to a programming model. When a message is received on a connection set up by the acceptor, the acceptor acts as a factory for specific decoders, protocol handlers (which may be referred to as MessageDispatchers) and connections. Embodiments of the acceptor mechanism may be used, for example, to adaptively alternate between XML and binary encoding, protocol and transport combinations on a remoting system server. The acceptor mechanism isolates change from the remoting system user while allowing a common remoting infrastructure to be reused.

Through embodiments, it is not necessary to have different programming models in a remoting system server just to use different EPT combinations. This may be accomplished on the server side by using acceptor as a factory for specific EPT combinations to receive and messages from and to a client.

While embodiments are primarily described herein in the context of RPC and messaging remoting systems, it is important to note that embodiments may be used in all types of remoting systems including, but not limited to, RPC, messaging, media streaming and group communication remoting systems.

Also note that, while embodiments of the system and method for dynamically and adaptively alternating encodings, protocols, and/or transports on remoting system servers, are generally described for client-server environments, embodiments may also be used in other computing environments, such as in peer-to-peer environments, to provide dynamic alternating of encodings, protocols, and/or transports for messaging between peers in the peer-to-peer environment.

Server-Side Acceptor Mechanism

Embodiments of a server-side mechanism that may allow a programmer to concentrate on the data being sent to a remote destination are described. The details of how that data is encoded and sent should not be an issue. The programmer should not need to change programming models just to use a different protocol. That should be handled by the infrastructure. In one embodiment, a server-side acceptor mechanism may enable adaptive EPT combinations and isolate change from the presentation block, and thus from the programmer using the remoting system. Embodiments of the acceptor mechanism may be used as an extensibility mechanism for remoting system server-side architectures such as the exemplary Presentation, Encoding, Protocol and transport (PEPt) client-side remoting system architecture described below.

Acceptor is a server-side (the role reacting to messages) mechanism that enables a single programming model to be used to communicate over a variety of encodings, protocols and transports (EPTs). Acceptor may be used to structure new remoting system servers and/or to enable existing remoting system servers to support evolving standards (e.g., JAX-RPC switching from SOAP-encoding to Doc-Literal) or a non-standard EPT such as JAX-FAST.

The following describes how acceptor relates to other middleware systems, how acceptor may be used in an exemplary Presentation, Encoding, Protocol and transport (PEPt) server-side remoting architecture, and how acceptor operates when handling a message in a remoting system server. The following also described how, for each message arriving on a connection created by an acceptor, the acceptor may act as a factory for other PEPt interface instances such as specific decoders and protocol handlers. Thus, in embodiments, a remoting system may dynamically adapt to new encodings, protocols and transports without changing the programming model presented to the programmer.

Embodiments of an acceptor mechanism as described herein may be used, for example, as the server-side configuration point of a Presentation, Encoding, Protocol and transport (PEPt) remoting architecture. The PEPt architecture defines the fundamental building blocks of remoting systems to be: Presentation, Encoding, Protocol and transport. The PEPt architecture may allow the user to understand, use and implement remoting system servers by providing a simple but comprehensive framework in which to place finer-grained details of distributed communications systems. The PEPt architecture may serve as a core, high-level remoting system architecture, and may provide a basis for understanding and implementing remoting systems. The PEPt remoting architecture primarily focuses on a high-level architecture in order to guide the overall structuring of a remoting system, including remoting system servers as described herein. The PEPt remoting architecture identifies the top-level "blocks" of a remoting system server, and shows how those blocks may interact to adaptively support alternate encodings, protocols and transports. The PEPt remoting architecture defines important interactions in a remoting system server, such as how two binding objects interact. Embodiments of the PEPt architecture are further described in U.S. patent application Ser. No. 10/677,434, titled "System and Methods Employing a PEPt Architecture for RPC".

The SOAP and WSDL specifications, for example, allow the specification of different transports and encodings. The PEPt remoting architecture is an architecture in which such specifications may be implemented. In a remoting system server implemented according to the PEPt architecture, an embodiment of the acceptor mechanism may be used in the binding role of specifying which parts of the communications infrastructure to use on a particular message. The acceptor mechanism may be used in remoting system servers implemented according to the PEPt architecture to dynamically select EPT combinations for particular messages and as a factory for dynamically constructing components to support selected EPT combinations.

FIGS. 1-12 illustrate means for means for determining an Encoding, Protocol, and Transport (EPT) combination supported by a remoting system server for receiving one or more messages from a remoting system client, means for receiving the messages from the remoting system client according to the determined EPT combination, and means for switching to a different EPT combination to receive other messages from the remoting system client or from a different remoting system client.

FIG. 1 illustrates a block-level view of an exemplary PEPt server-side architecture including an acceptor mechanism according to one embodiment. The PEPt architecture defines the fundamental building blocks of remoting systems to be: Presentation 100, Encoding 102, Protocol 104, and transport 106. Presentation 100 may encompass the data types and APIs available to a programmer. Encoding 102 may decode encoded data types received on the wire for presentation 100 via a decoder 132, and may also describe or encode the representation of those data types on the wire via an encoder 130. Protocol 104 frames the data encoding to denote the intent of a message. Transport 106 may move the encoding and protocol from one location to another. Acceptor 180 may serve as a factory for specific instances of interfaces in one or more of the blocks of the PEPt. While the acceptor mechanism is primarily described herein in the context of an exemplary PEPt server-side remoting architecture, note that embodiments of an acceptor mechanism may also be used in other remoting architectures.

The PEPt remoting architecture provides a definition of the fundamental blocks of remoting system servers. These blocks may be used to partition a remoting system server infrastructure to enable the remoting system server to support multiple EPTs while isolating changes from the remoting system user, and may also provide the ability to extend and/or reuse common remoting infrastructure (e.g., thread and connection pools). Acceptor 180 may be used in a remoting system server implemented according to the PEPt remoting architecture as a factory for specific instances of interfaces in each PEPt block. Embodiments may be used, for example, to adaptively alternate between XML and binary encoding, protocol and transport combinations in RMI and other systems. In one embodiment, the role of the blocks in FIG. 1 may be defined as:

The presentation block 100 includes the APIs used to interact with a remoting system (e.g., ties 120), the data types that may be transferred, and error reporting.

The encoding block 102 denotes the "wire" representation of presentation data types and the conversion process from language representation to wire representation and vice versa.

The protocol block 104 is responsible for "framing" the encoded data of outgoing messages or "unframing" the encoded data of incoming messages, and for indicating the intent of outgoing messages and/or determining the intent of incoming messages.

The transport block 106 moves a message (i.e., the encoded data and protocol framing) from one location to another.

The PEPt 108 block is involved in all aspects of the remoting infrastructure, while the EPT block 110 includes acceptor 180, which is the factory for encoding, protocol and transport interface instances.

A server-side programmer may use a remoting system by way of a Tie 120 (for RPC) or a Delegate 122 and MessageInfo 140 (for Messaging). The Delegate 122 is the access point for the remoting infrastructure, and the MessageInfo 140 is the place where data is placed when receiving a message (and, optionally, for sending a reply). The Tie 120 is an adapter that hides the Delegate 122 and MessageInfo 140. The Tie 120 transforms a method invocation (received from a client) into a messaging operation by placing the method arguments into the MessageInfo 140 and then using the Delegate 122 to send the message.

An acceptor 180 represents the address and EPT capabilities of a server address. In one embodiment, if the server has multiple addresses capability, there may be an acceptor 180 associated with each address. Each address typically handles a single EPT combination. In one embodiment, two or more EPTs may be multiplex at a single address.

When a message arrives at an address, the acceptor 180 associated with the address acts as a factory for messaging infrastructure interfaces. Acceptor 180 is a factory for creating a Decoder 132 (and an Encoder 130 if a reply is expected) for the specific encoding in the EPT represented by acceptor 180. In addition, acceptor 180 is a factory for the specific protocol handler (MessageDispatcher 160) that handles the protocol and the specific transport Connection 150.

The following describes how acceptor 180 operates in the context of receiving a message and sending a reply, if necessary or desired, according to one embodiment. Acceptor 180 enables a programmer to concentrate on the data being received from a peer or client. The details of how that data is encoded and sent are not an issue. In embodiments, the programmer does not need to change programming models just to use a different protocol, as this is handled by the infrastructure. Acceptor 180 enables adaptive EPTs and isolates change from the presentation block 100, and thus from the programmer using the remoting system. In one embodiment, acceptor 180 is the central extensibility mechanism of the PEPt server-side architecture. The following describes acceptor 180 in relation to the messaging model, since RPC may be regarded as a "layer" on top of the messaging model.

An exemplary server may be remotely reachable in multiple ways such as CDR (Common Data Representation) over IIOP, SOAP over HTTP, and may also be locally reachable via shared memory or Solaris Doors, for example. In one embodiment, for each EPT supported by the server, an acceptor 180 may be created that handles incoming connection requests. The server may advertise its EPT capabilities, and the addresses of those capabilities, by placing that information in an object reference, by making the information available in a registry, or by some other method. In one embodiment, the server infrastructure may allow acceptors 180 to be registered such that the acceptors 180 listen for connection requests from clients.

In one embodiment, an acceptor 180 represents an encoding, protocol, transport (EPT) combination supported by the server. As such, an acceptor 180 may serve as a factory for a specific Decoder 132, MessageDispatcher 160, and Connection 150, thus enabling a single programming model to be used with multiple EPTs.

When a client first communicates with the server, the acceptor 180, acting as a Connection factory, creates a Connection 150 on which messages may be received or transmitted. Connection 150 may maintain a reference to the acceptor 180 that created it so that the Connection 150 may use the acceptor 180 as a factory for a protocol handlers (MessageDispatcher 160) and a Decoder 132 when a message arrives on the Connection 150.

When the Connection 150 is created, acceptor 180 may initialize the Connection 150 with a reference to the Delegate 122 that represents the overall PEPt system as well as a reference to the creating acceptor 180. When a message arrives on a Connection 150, the Connection 150 first obtains a message structure (referred to herein as MessageInfo 140) from the Delegate. The MessageInfo 140 may include the data and metadata associated with the message, along with references to PEPt interface instances such as the Connection 150, MessageDispatcher 160 and Decoder 132 used for this message.

Figure 2:
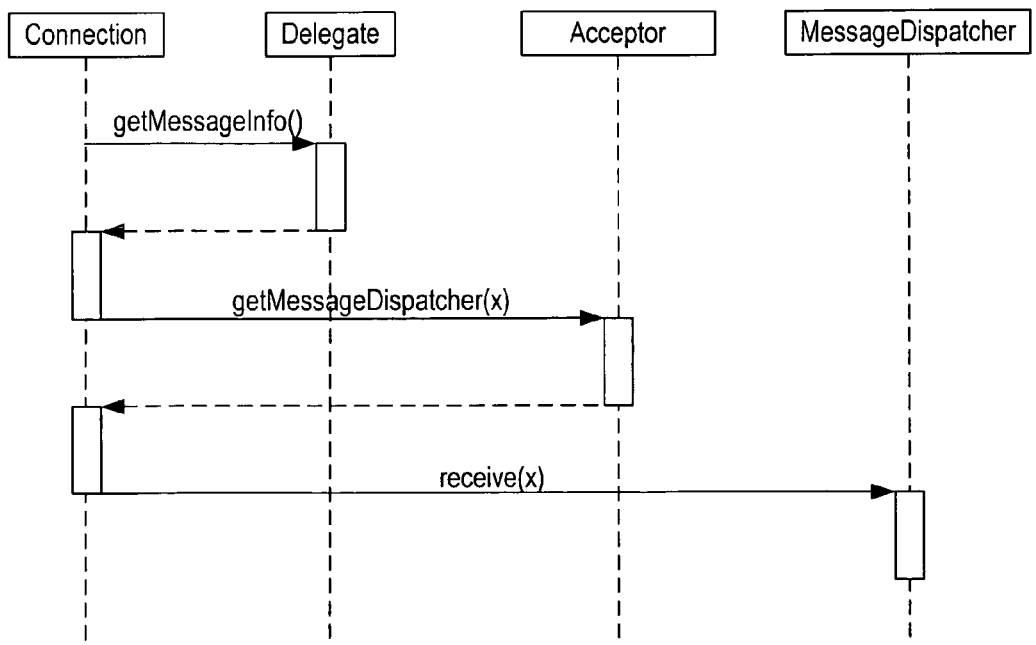
FIG. 2 illustrates a connection transferring control to a protocol handler (MessageDispatcher) according to one embodiment.

The Connection 150 then may use its associated acceptor 180 to obtain a protocol-specific protocol handler (MessageDispatcher 160). The Connection 150 may then transfer control to the protocol-specific MessageDispatcher 160. In one embodiment, the Connection 150 may transfer control to the MessageDispatcher 160 as illustrated in FIG. 2.

In one embodiment, if acceptor 180 is a multi-protocol acceptor, the multi-protocol acceptor 180 may need to examine some of the raw bits of the message to determine the EPT combination to use.

Figure 3:
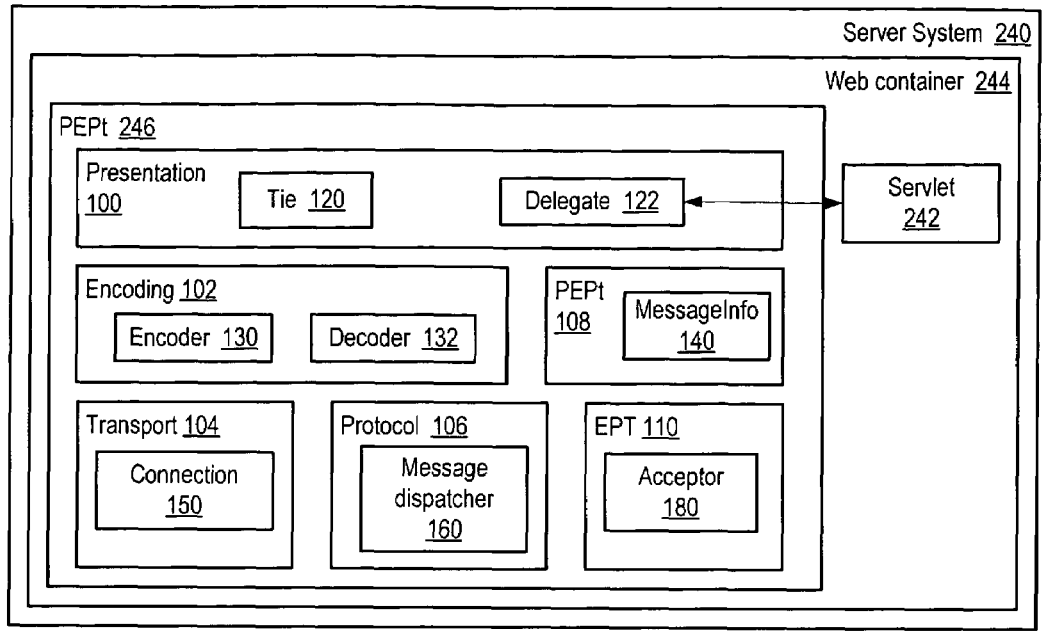
FIG. 3 illustrates a server-side PEPt embedded in a web container on a server system according to one embodiment.

As illustrated in FIG. 3, in one embodiment, the server-side PEPt 246 may be embedded in a web container 244 (e.g., an Apache, Tomcat, or other web container) on a server system 240. In this case, the underlying web container 244 may handle accepting connections and providing data streams to plug-in modules such as servlet 242.

Figure 4:
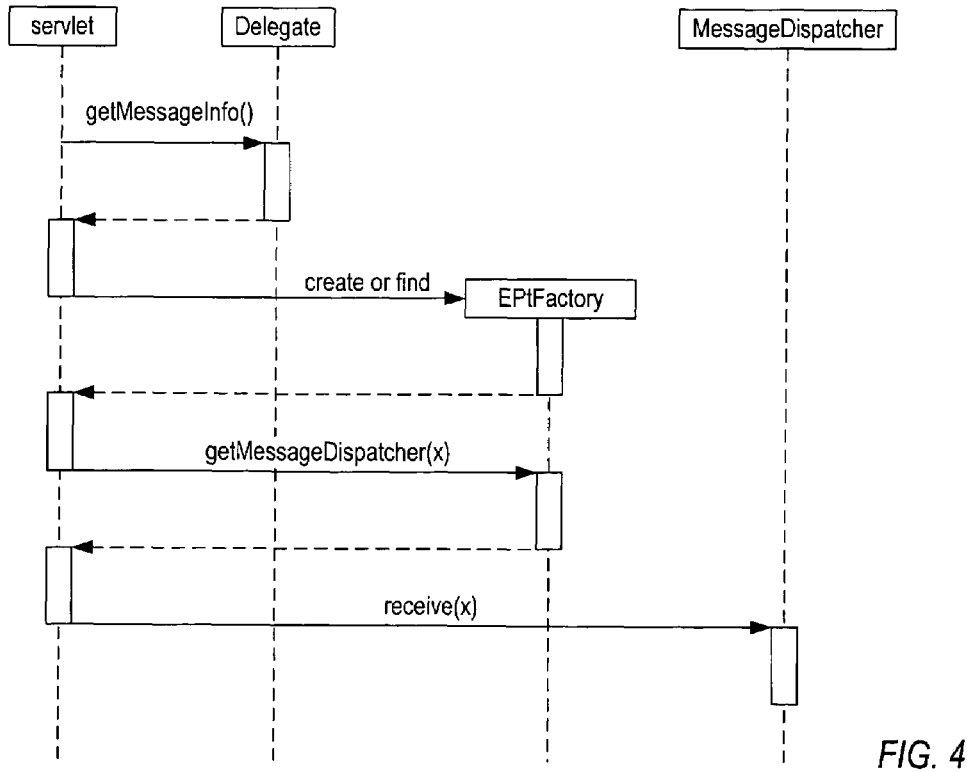
FIG. 4 illustrates PEPt in a web container interacting with a servlet according to one embodiment.

FIG. 4 illustrates PEPt in a web container interacting with a servlet according to one embodiment. In this embodiment, for a PEPt embedded in a web container, a module (e.g., a servlet) may interact with the Delegate (representing PEPt) to obtain a MessageInfo 140 in which to place the raw data and/or metadata of the request (or references to streams). The servlet may use metadata from the headers (e.g., HTTP headers) to determine the appropriate EPT factory (referred to herein as EPtFactory) type. In one embodiment, EPtFactory is a base class for acceptor that has the methods for creating the EPT interfaces. However, in one embodiment, EPtFactory may not provide the acceptor's connection accepting/creation responsibilities. The servlet may then use the metadata to create or find the appropriate EPtFactory instance. The servlet then may use the EPtFactory instance to obtain a protocol-specific MessageDispatcher. The servlet then transfers control to the protocol-specific MessageDispatcher. In one embodiment, the remainder of the processing may use a factory to obtain Decoders and Interceptors (and Encoders if there is a reply). By using the EPtFactory, the rest of the architecture is isolated from whether the server-side PEPt is embedded in a web container or is a stand-alone server managing its own connections.

Note that, in one embodiment, the MessageDispatcher may be created directly, rather than by first creating an EPtFactory.

Figure 5:
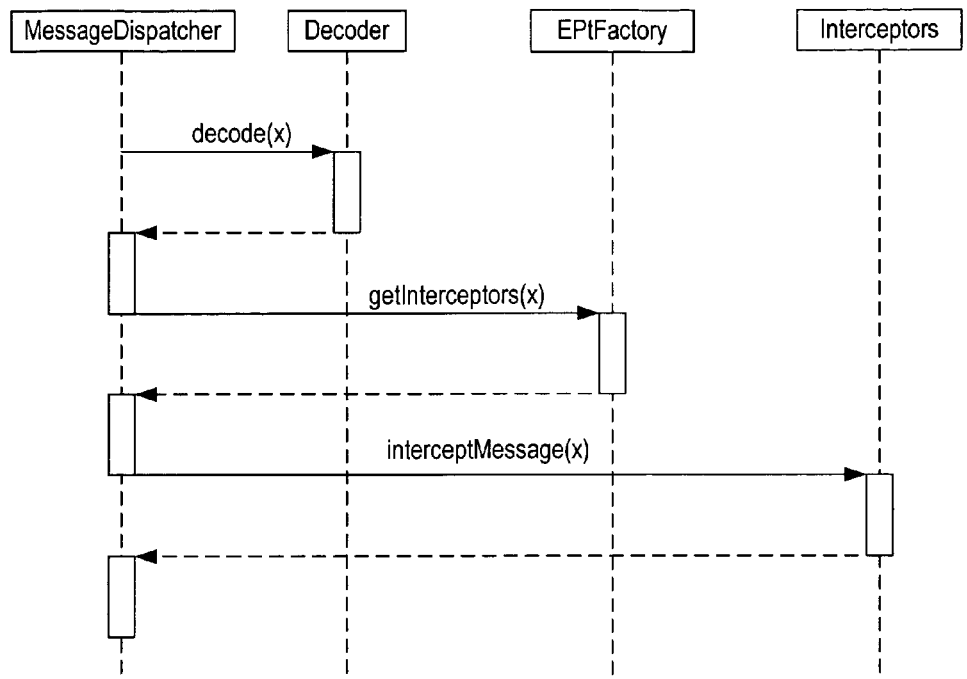
FIG. 5 illustrates message decoding and intercepting in a server-side PEPt according to one embodiment.

FIG. 5 illustrates message decoding and intercepting in a server-side PEPt according to one embodiment. In embodiments, the MessageDispatcher may use acceptor (or its base class EPtFactory) to obtain a Decoder. The Decoder decodes the data from the Connection or, if in a web container, from the web container's data streams. The decoder may decode the entire data or alternatively make the data available in a streaming, "pull" fashion. In one embodiment, if the Decoder decodes the entire data, it places the decoded data into a MessageInfo structure.

In one embodiment, after decoding, the MessageDispatcher may use the EPtFactory to obtain an Interceptor that may reflect on and react to the message. Interceptors may be, but are not necessarily protocol-specific such as OMG PortableInterceptors or JAX-RPC handlers. Since the EPtFactory is specific to the protocol, it is able to provide an invocation wrapper, referred to as Interceptors, around the protocol-specific interceptors. The MessageDispatcher then gives control to Interceptors along with the MessageInfo instance that contains all data and/or metadata associated with the message.

In one embodiment, during or after decoding, the decoded data may have other operations to be applied such as compression, encryption and/or checksumming. In one embodiment, encoded-level interceptors may be plugged in independently of Decoders. In another embodiment, these types of operations may be provided by the Decoders themselves to avoid traversing the data multiple times.

Figure 6:
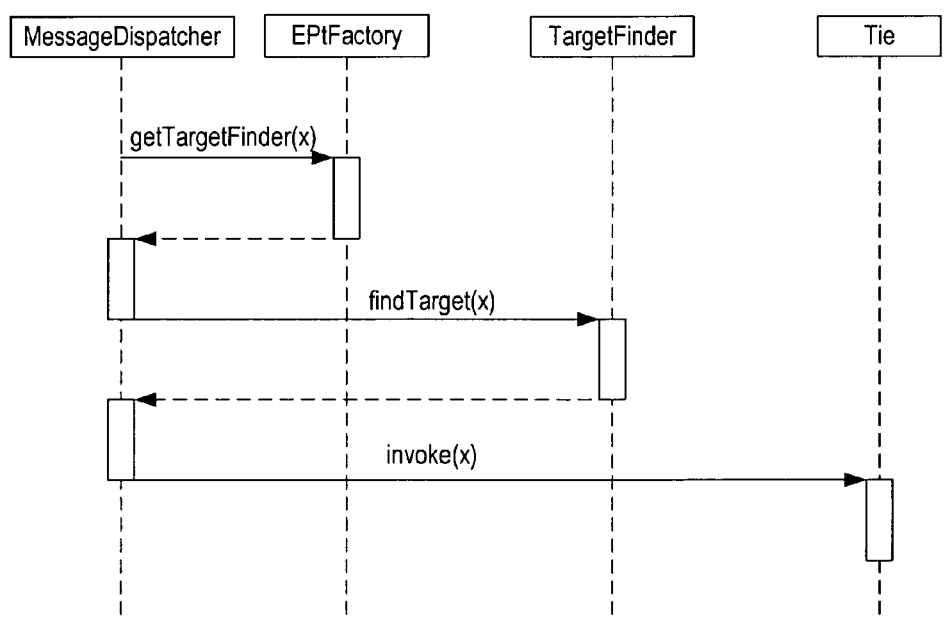
FIG. 6 illustrates finding a Tie according to one embodiment.

FIG. 6 illustrates finding a Tie according to one embodiment. After interception, MessageDispatcher may use EPtFactory to obtain a protocol-specific TargetFinder. TargetFinder is responsible for finding or creating the appropriate Tie. A TargetFinder may be implemented in a variety of ways, for example as a Portable Object Adapter (POA) or as a JAX-RPC deployment descriptor. Once the appropriate Tie instance is found, the MessageDispatcher transfers control to the Tie.

Note that this discussion has focuses on RPC/RMI. However, most if not all of the sequences described above are common to messaging systems in general. In a messaging system, the operation of finding a target may be to find the appropriate queue on which to place the decoded message, and possibly also to notify a registered waiter of the message arrival.

Figure 7:
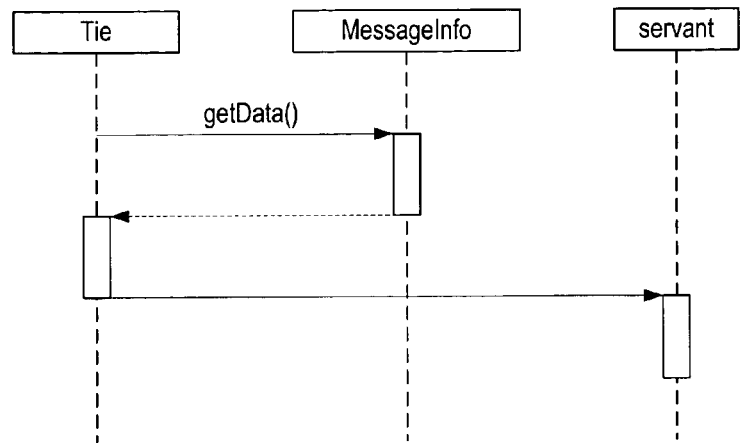
FIG. 7 illustrates invoking a Target Object according to one embodiment.

FIG. 7 illustrates invoking a Target Object according to one embodiment. In one embodiment, the Tie may obtain the decoded data from MessageInfo and then call the "servant" object that contains the actual business logic.

Figure 8:
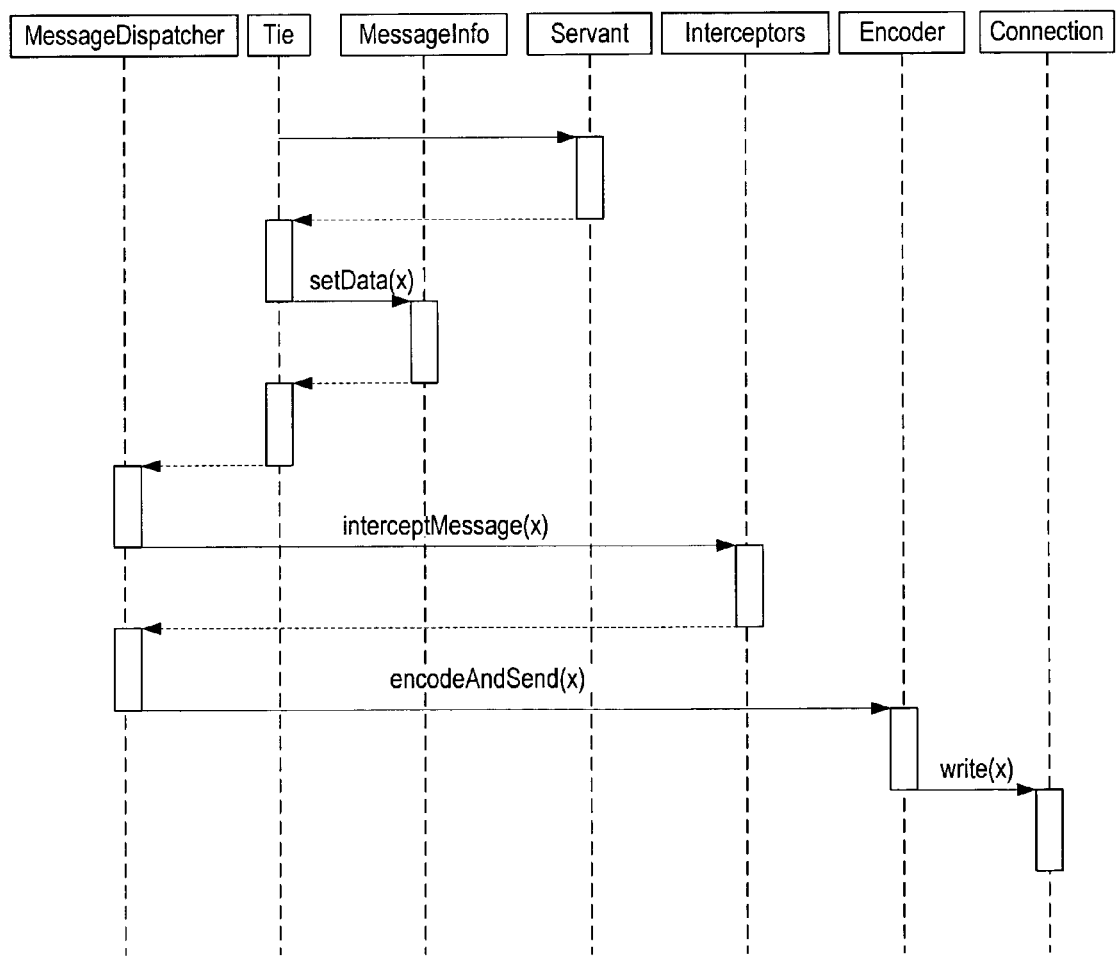
FIG. 8 illustrates handling a reply according to one embodiment.

FIG. 8 illustrates handling a reply according to one embodiment. If a reply is expected, the MessageDispatcher may use EPtFactory (acceptor) to obtain appropriate Encoders, Interceptors and Connections (or streams, in the case of a web container) with which to send the reply.

In FIG. 8, the EPtFactory (acceptor) is not shown being used as a Factory. Instead, the sequence of interactions with PEPt interface instances obtained via the EPtFactory is shown in FIG. 8. Although FIG. 8 shows explicit calls, in one embodiment, some or all of the sequence may result from unwinding the control stack, depending on the nature of the protocol and message exchange pattern in use.

In one embodiment, MessageInfo (represented by the x in the diagrams of FIGS. 4-8) may be used as the primary data passed between the interfaces of the PEPt blocks. In one embodiment, MessageInfo, in addition to containing the message (meta)data, may also contain references to the protocol handler (MessageDispatcher), Encoder and Connection. This may simplify adding new EPTs that may depend on details of specific interface implementations. For example, to support fragmentation, the Encoder may need to send encoded fragments while it encodes the complete message independent of MessageDispatcher control. However, MessageInfo does not have state, leading to unstructured access to its contents. Providing the references in the MessageInfo may provide some control of what is available at particular points in the message dispatch.

Implementing an embodiment of the acceptor mechanism within the PEPt remoting architecture isolates changing details within the appropriate blocks of the PEPt remoting architecture so that the system as a whole may function in a consistent manner despite evolutionary and dynamic changes. The acceptor mechanism may be used to select appropriate EPT combinations for particular messages from particular sources and to generate the appropriate encodings, protocols and transports to handle those message and to, if necessary, package and transmit response messages "over the wire".

Embodiments of the acceptor mechanism and the PEPt remoting architecture may be used, for example, in remoting system servers in an RMI system to support CDR/IIOP and SOAP/HTTP. As another example, embodiments of the acceptor mechanism and the PEPt remoting architecture may be used to integrate ASN.1/HTTP into JAX-RPC on remoting system servers. Note that these examples are not intended to be limiting; embodiments of the acceptor mechanism and the PEPt remoting architecture may be used in remoting system servers in other types or combinations of remoting systems, and in addition, embodiments of the acceptor mechanism may be used with other remoting architectures than the PEPt remoting architecture.

Embodiments of the acceptor mechanism may be used to provide the server-side extensibility point in the PEPt remoting architecture that allows a single consistent remoting system to evolutionary and adaptively change encodings, protocol and transports. The high-level view of remoting systems provided for remoting system servers by acceptor and PEPt abstracts many details such as component frameworks, threading, and thread and connection pools. PEPt focuses its attention on the largest building blocks of a remoting system and keeps the number of blocks to a minimum in order to guide the overall structuring of the remoting system server.

Figure 9:
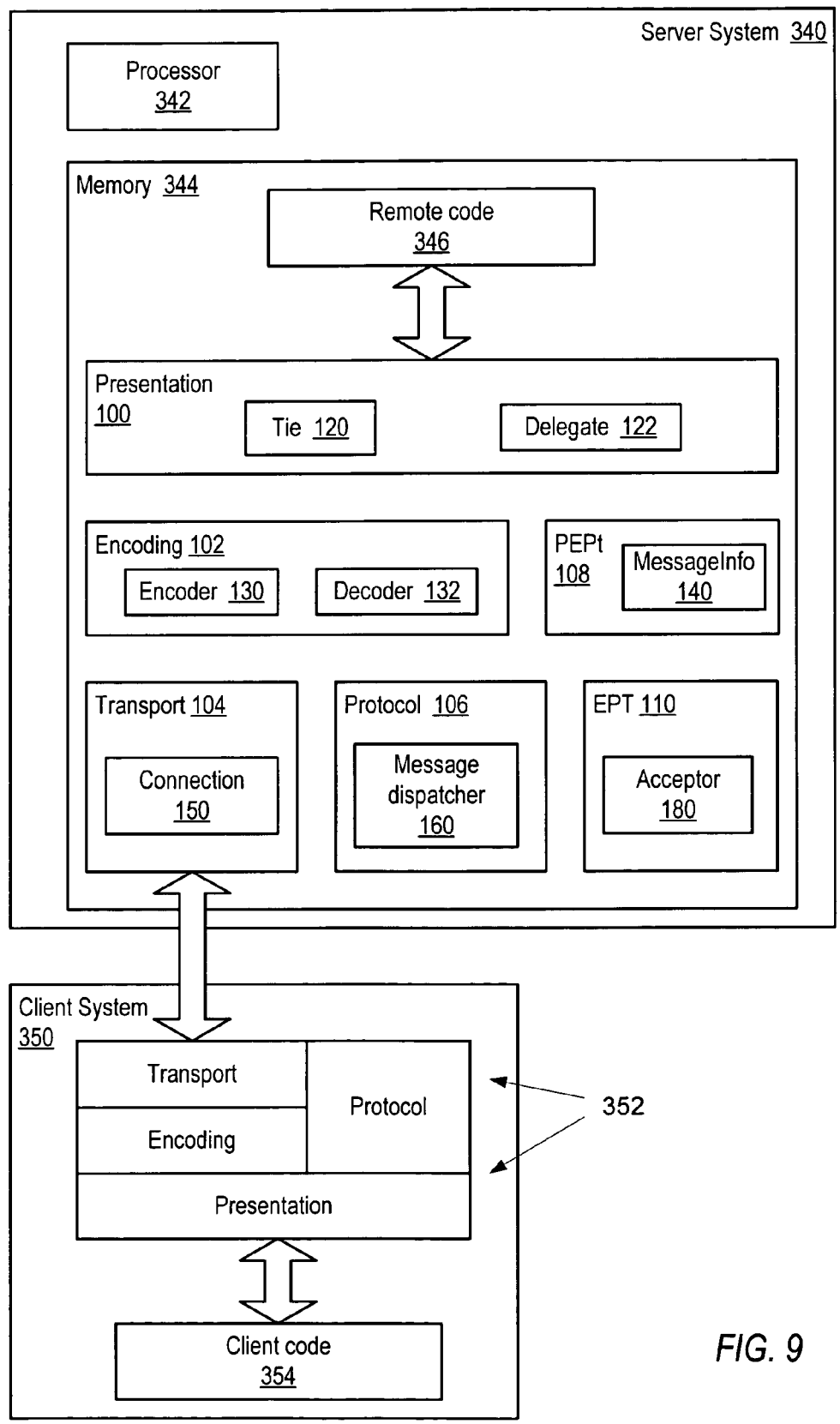
FIG. 9 illustrates a system implementing an exemplary PEPt server-side architecture including an acceptor mechanism according to one embodiment.

FIG. 9 illustrates a system implementing an exemplary PEPt server-side architecture including an acceptor mechanism according to one embodiment. Server system 340 may be any of various types of devices, including, but not limited to, a personal computer system, desktop computer, laptop or notebook computer, mainframe computer system, workstation, network computer, or other suitable device. In general, server system 340 may be any device with a digital heartbeat. Server system 340 may include at least one processor 342. The processor 342 may be coupled to a memory 344. Memory 344 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Server system 340 may include, in memory 344, an implementation of a PEPt server-side architecture including an acceptor mechanism, and may include presentation 100, encoding 102, protocol 104, transport 106, PEPt 108, and EPT 110 blocks, such as those described for FIG. 1. Server system 340 may also include, in memory, remote code 246 to be accessed and/or invoked by a client-side implementation of the PEPt remoting architecture on a client system 350. Server system 340 may couple over a network via one or more wired or wireless network interfaces to one or more other devices such as client system 350 which may, but do not necessarily, include an implementation of a PEPt client side architecture 352. A client system 350 may also include client code 354 configured to interact with the PEPt client-side implementation via the presentation block.

While FIG. 9 illustrates an exemplary scenario in which both server system 340 and client system 350 include an implementation of a PEPt architecture, with the server-side implementation including an acceptor mechanism as described herein, note that, in one embodiment, a server system 340 using the PEPt architecture including an acceptor mechanism may communicate with a client system using another remoting architecture as long as both systems agree on the underlying wire protocol.

As previously mentioned, one embodiment may provide a mechanism to isolate encoding changes in remoting system servers. The mechanism may enable a message exchange to dynamically change the encoding in use on the remoting system server without the need to change other parts of the remoting system server such as presentation, protocols and/or transport. In one embodiment, if the acceptor mechanism has generated the components or interfaces to support an EPT combination including a specific connection, protocol handler and decoder on the remoting system server, and the acceptor mechanism switches to support a different EPT combination on the remoting system server where only the Encoding part of the combination is different from the EPT combination currently in use on the remoting system server, the acceptor mechanism may selectively replace only the components or interfaces on the remoting system server necessary to handle the different encoding (e.g., the decoder) and not any instances of components or interfaces that are the same in the new EPT as in the prior EPT, such as the protocol handler and connection.

One embodiment may provide a mechanism to isolate protocol changes in remoting system servers. The mechanism may enable a message exchange to dynamically change the protocol in use on the remoting system server without the need to change other parts of the remoting system server such as presentation, encoding and/or transport. In one embodiment, if the acceptor mechanism has generated the components or interfaces to support an EPT combination including a specific connection, protocol handler and decoder on the remoting system server, and the acceptor mechanism switches to support a different EPT combination on the remoting system server where only the Protocol part of the combination is different from the EPT combination currently in use on the remoting system server, the acceptor mechanism may selectively replace only the components or interfaces on the remoting system server necessary to handle the different Protocol (e.g., the Protocol Handler) and not any instances of components or interfaces that are the same in the new EPT as in the prior EPT, such as the decoder and connection.

One embodiment may provide a mechanism to isolate transport changes in remoting system servers. The mechanism may enable a message exchange to dynamically change the transport in use on the remoting system server without the need to change other parts of the remoting system server such as presentation, encoding, and/or protocol. In one embodiment, if the acceptor mechanism has generated the components or interfaces to support an EPT combination including a specific connection, protocol handler and decoder on the remoting system server, and the acceptor mechanism switches to support a different EPT combination on the remoting system server where only the transport part of the combination is different from the EPT combination currently in use on the remoting system server, the acceptor mechanism may selectively replace only the components or interfaces on the remoting system server necessary to handle the different transport (e.g., the connection) and not any instances of components or interfaces that are the same in the new EPT as in the prior EPT, such as the protocol handler and decoder.

Figure 10:
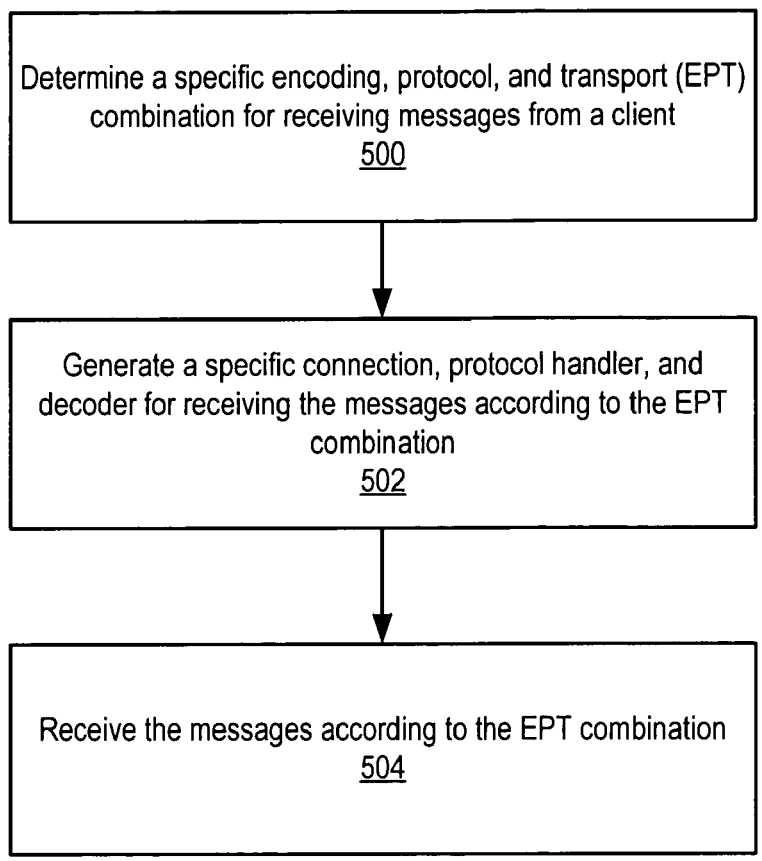
FIG. 10 is a flowchart of a method of operation of an acceptor mechanism in a remoting system server according to one embodiment.
Figure 11:
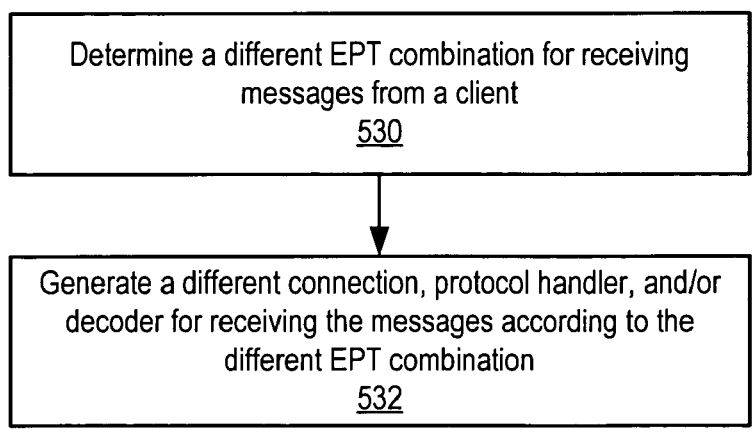
FIG. 11 is a flowchart of a method of operation of an acceptor mechanism in a remoting system server switching to a different EPT combination according to one embodiment.
Figure 12:
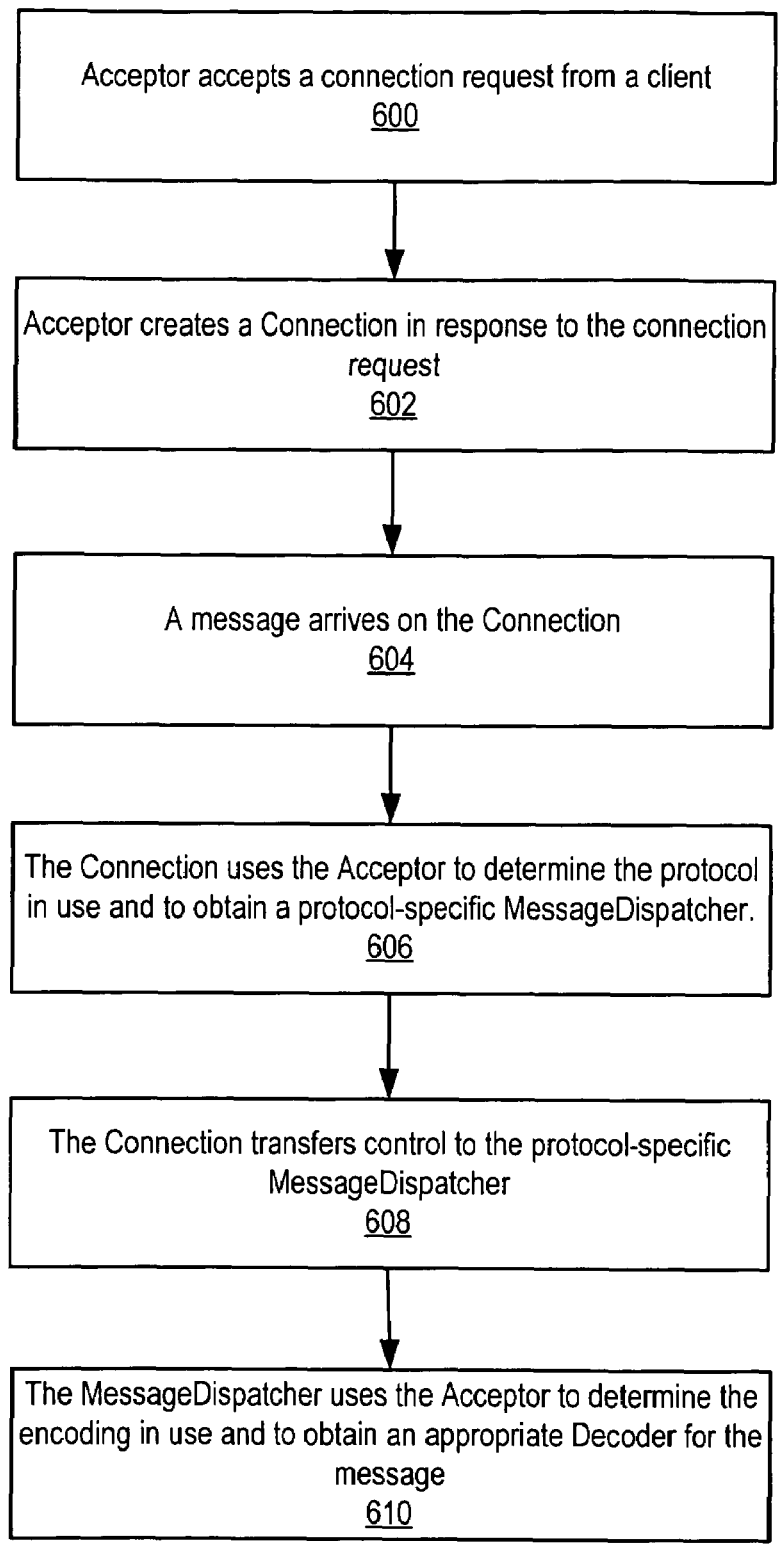
FIG. 12 is a flowchart of an acceptor mechanism serving as a factory for decoders, protocol handlers, and/or connections for EPT combinations in a remoting system server according to one embodiment.

FIGS. 10-12 are flowcharts of a method for dynamically and adaptively alternating encodings, protocols, and/or transports in a remoting system server according to embodiments. Two or more encoding, protocol, and transport (EPT) combinations may be supported by a remoting system server. In one embodiment, the remoting system server may advertise the EPT combinations so that remoting system clients may discover the published advertisements for the EPT combinations. In these flowcharts, in one embodiment, the remoting system server may be implemented according to a Presentation, Encoding, Protocol, and Transport (PEPt) remoting architecture. In one embodiment, the remoting system client may be implemented according to a PEPt remoting architecture. In one embodiment, both the remoting system client and server may be implemented according to a PEPt remoting architecture.

FIG. 10 is a flowchart of a method of operation of an acceptor mechanism in a remoting system server according to one embodiment. The remoting system server may receive a connection request from a remoting system client. As indicated at 500, a specific encoding, protocol, and transport (EPT) combination for receiving messages from the client may be determined. In one embodiment, the acceptor mechanism may determine the EPT combination to be used from the connection request. As indicated at 502, the acceptor mechanism may then generate a specific connection, protocol handler, and decoder for receiving the messages according to the EPT combination. In one embodiment, the remoting system server may be implemented according to a Presentation, Encoding, Protocol, and Transport (PEPt) remoting architecture; the decoder may be part of an encoding block of the PEPt architecture, the protocol handler may be part of a protocol block of the PEPt architecture, and the connection may be part of a transport block of the PEPt architecture. The acceptor mechanism may be part of an EPT block of the PEPt architecture. As indicated at 504, the remoting system server may then receive and process the one or more messages from the client according to the EPT combination via the specific connection, protocol handler and decoder generated by the acceptor mechanism.

In one embodiment, the acceptor mechanism, if necessary, may generate an encoder for transmitting one or more messages to the remoting system client in response to the one or more received messages.

FIG. 11 is a flowchart of a method of operation of an acceptor mechanism in a remoting system server switching to a different EPT combination according to one embodiment. The remoting system server may receive another connection request from the same client from which it received a previous connection request or from a different remoting system client. As indicated at 530, a different EPT combination than the one currently in use by the remoting system server may be determined for receiving messages from the client that made the connection request. The acceptor mechanism may then generate a different connection, protocol handler, and/or decoder on the remoting system server for receiving the messages according to the different EPT combination. The remoting system server may then receive one or more messages from the remoting system client according to the different EPT combination.

The acceptor mechanism may act as a factory for decoders, protocol handlers, and/or connections for the determined EPT combination. Other embodiments may generate one or more other infrastructure interfaces and/or objects on the remoting system server to receive messages. In one embodiment, the remoting system server may only generate infrastructure interfaces and/or objects necessary to support changed portions of the EPT combination from the original EPT combination without affecting infrastructure interfaces and/or objects that support portions of the EPT combination that have not changed. In one embodiment, if only one or two of protocol, encoding, and transport are different in the different EPT combination to receive the messages according to the different EPT combination, the acceptor mechanism may only change the affected parts of the remoting system server to implement the different EPT combination to receive the messages without affecting the parts of the remoting system server that are the same in the two EPT combinations. Thus, if only the protocol is different, then the acceptor mechanism may only replace the protocol handler. If only the encoding is different, then the acceptor mechanism may only replace the decoder. If only the transport is different, then the acceptor mechanism may only replace the connection. If the protocol and transport have changed, then the acceptor mechanism may replace the protocol handler and connection, without affecting the decoder, and so on.

FIG. 12 is a flowchart of an acceptor mechanism serving as a factory for decoders, protocol handlers, and/or connections for encoding, protocol, and transport (EPT) combinations in a remoting system server according to one embodiment. As indicated at 600, the Acceptor accepts a connection request from a from a remoting system client. As indicated at 602, the Acceptor may generate a connection to receive messages from the client. At some point, a message from the client arrives on the Connection, as indicated at 604. The Connection the uses the Acceptor to determine the protocol in use and to obtain a protocol-specific MessageDispatcher, as indicated at 606. In one embodiment, if multiple protocols are supported on the Connection, the Acceptor may examine the message to determine the protocol in use. As indicated at 608, the Connection then transfers control to the protocol-specific MessageDispatcher. As indicated at 610, the MessageDispatcher uses the Acceptor to determine the encoding in use and to obtain an appropriate Decoder for the message. The Decoder may then provide the decoded data to the presentation block of the remoting system server.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A remoting system, comprising:
one or more computers configured to implement:
a remoting system client; and
a remoting system server comprising an acceptor mechanism configured to handle message exchange with remoting system clients according to two or more distinct Encoding, Protocol, and Transport (EPT) combinations, wherein the remoting system server is configured to advertise the two or more EPT combinations for discovery by remoting system clients, and wherein the acceptor mechanism is configured to:
receive a connection request from the remoting system client;
in response to the connection request, generate a connection on the remoting system server configured to receive incoming messages from the remoting system client in accordance with a particular transport protocol of a plurality of transport protocols supported by the remoting system server and indicated by the connection request;
in response to the connection receiving an incoming message from the remoting system client:
determine a particular protocol of the incoming message from among a plurality of message protocols supported by the remoting system server;
generate a protocol handler on the remoting system server configured to handle the determined protocol of the incoming message;
determine a particular data encoding of the incoming message from among a plurality of data encodings supported by the remoting system server, wherein the plurality of data encodings include eXtensible Markup Language (XML) data encoding and binary data encoding; and
in response to invocation by the protocol handler, generate a decoder on the remoting system server configured to decode data of the incoming message in accordance with the determined data encoding.

2. The remoting system as recited in claim 1, wherein, to generate a protocol handler on the remoting system server, the connection is configured to invoke the acceptor mechanism to generate the protocol handler in response to receiving the incoming message from the remoting system client.

3. The remoting system as recited in claim 1, wherein, in response to the connection receiving an incoming message from the remoting system client, the acceptor mechanism is configured to generate an encoder for transmitting response messages to the remoting system client in accordance with the determined data encoding.

4. The remoting system as recited in claim 1, wherein the remoting system server is implemented according to a Presentation, Encoding, Protocol, and Transport (PEPt) remoting architecture.

5. The remoting system as recited in claim 4, wherein the PEPt remoting architecture is implemented in a web container on the remoting system server.

6. The remoting system as recited in claim 1, wherein the remoting system client is implemented according to a Presentation, Encoding, Protocol, and Transport (PEPt) remoting architecture.

7. The remoting system as recited in claim 1, wherein the remoting system is implemented according to a Presentation, Encoding, Protocol, and Transport (PEPt) remoting architecture.

8. The remoting system as recited in claim 1, wherein the acceptor mechanism is further configured to generate a different connection, a different protocol handler, and a different decoder on the remoting system server to handle other incoming messages according to a different EPT combination.

9. The remoting system as recited in claim 1, wherein the acceptor mechanism is further configured to generate a different connection on the remoting system server without affecting the current protocol handler and current decoder to handle other incoming messages according to an EPT combination where only the transport of the EPT combination is different from the current EPT combination.

10. The remoting system as recited in claim 1, wherein the acceptor mechanism is further configured to generate a different protocol handler on the remoting system server without affecting the current connection and current decoder to handle other incoming messages according to an EPT combination where only the protocol of the EPT combination is different from the current EPT combination.

11. The remoting system as recited in claim 1, wherein the acceptor mechanism is further configured to generate a different decoder on the remoting system server without affecting the current protocol handler and current connection to handle other incoming messages according to an EPT combination where only the encoding of the EPT combination is different from the current EPT combination.

12. A system, comprising:
a processor; and
a memory comprising program instructions, wherein the program instructions are executable by the processor to implement a remoting system server comprising an acceptor mechanism configured to handle message exchange with remoting system clients according to two or more distinct Encoding, Protocol, and Transport (EPT) combinations, wherein the remoting system server is configured to advertise the two or more EPT combinations for discovery by remoting system clients, and wherein the acceptor mechanism is configured to:
receive a connection request from a remoting system client;
in response to the connection request, generate a connection configured to receive incoming messages from a remoting system client in accordance with a particular transport protocol of a plurality of transport protocols supported by the remoting system server and indicated by the connection request;
determine a particular protocol of the incoming messages from among a plurality of message protocols supported by the remoting system server;
generate a protocol handler configured to handle the determined protocol of the incoming messages;
determine a particular data encoding of the incoming messages from among a plurality of data encodings supported by the remoting system server wherein the plurality of data encodings include eXtensible Markup Language (XML) data encoding and binary data encoding; and
in response to invocation by the protocol handler, generate a decoder configured to decode data of the incoming messages in accordance with the determined data encoding.

13. The system as recited in claim 12, wherein, to generate a protocol handler on the remoting system server, the connection is configured to invoke the acceptor mechanism to generate the protocol handler in response to receiving an incoming message from the remoting system client.

14. The system as recited in claim 12, wherein, in response to the connection receiving an incoming message from the remoting system client, the acceptor mechanism is configured to generate a specific encoder for transmitting response messages to the remoting system client in accordance with the determined data encoding.

15. The system as recited in claim 12, wherein the remoting system server is implemented according to a Presentation, Encoding, Protocol, and Transport (PEPt) remoting architecture, wherein the decoder is part of an encoding block of the PEPt architecture, wherein the protocol handler is part of a protocol block of the PEPt architecture, and wherein the connection is part of a transport block of the PEPt architecture.

16. The system as recited in claim 15, wherein the PEPt remoting architecture is implemented in a web container on the remoting system server.

17. The system as recited in claim 12, wherein the acceptor mechanism is further configured to generate one or more of a different connection, a different protocol handler, and a different decoder on the remoting system server to handle other incoming messages according to a different EPT combination.

18. A system, comprising:
a processor; and
a memory comprising program instructions, wherein the program instructions are executable by the processor to implement a remoting system server server configured to advertise a plurality of distinct Encoding, Protocol, and Transport (EPT) combinations supported by the remoting system server for discovery by remoting system clients, wherein the remoting system server comprises an acceptor mechanism configured to:
receive a connection request from a remoting system client;
determine one of the plurality of distinct EPT combinations supported by the remoting system server for receiving one or more messages from the remoting system client in response to said connection request;
generate, according to the determined EPT combination a specific connection according to a particular transport protocol from among a plurality of transport protocols supported by the remoting system server and a specific protocol handler according to a particular message protocol from among a plurality of message protocols supported by the remoting system server, in response to invocation by the protocol handler generate a specific decoder according to a particular data encoding from among a plurality of data encodings supported by the remoting system server, wherein the plurality of data encodings include eXtensible Markup Language (XML) data encoding and binary data encoding; and receive the one or more messages from the remoting system client in accordance with the generated specific connection protocol handler, and decoder.

19. The system as recited in claim 18, wherein the remoting system server is implemented according to a Presentation, Encoding, Protocol, and Transport (PEPt) remoting architecture, wherein the decoder is part of an encoding block of the PEPt architecture, wherein the protocol handler is part of a protocol block of the PEPt architecture, and wherein the connection is part of a transport block of the PEPt architecture.

20. The system as recited in claim 18, wherein the acceptor mechanism is further configured to generate a specific encoder for transmitting one or more messages to the remoting system client in response to the one or more received messages.

21. The system as recited in claim 18, wherein the remoting system server is implemented according to a Presentation, Encoding, Protocol, and Transport (PEPt) remoting architecture.

22. The system as recited in claim 18, wherein the acceptor mechanism is further configured to:
receive another connection request from a different remoting system client;
determine a different one of the plurality of EPT combinations supported by the remoting system server for receiving one or more messages from the different remoting system client in response to the other connection request;
generate a different connection protocol handler and decoder according to the determined different EPT combination to receive the one or more messages from the different remoting system client; and
receive the one or more messages from the different remoting system client according to the different EPT combination.

23. A system, comprising:
a processor; and
a memory comprising program instructions, wherein the program instructions are executable by the processor to implement a remoting system server configured to advertise a plurality of distinct Encoding, Protocol, and Transport (EPT) combinations supported by the remoting system server for discovery by remoting system clients, wherein the remoting system server comprises an acceptor mechanism configured to:
receive a connection request from a remoting system client;
determine one of the plurality of EPT combinations supported by the remoting system server for handling messages from the remoting system client in response to said connection request; and
generate a connection configured to:
receive the incoming messages from the remoting system client in accordance with a particular transport protocol of a plurality of transport protocols supported by the remoting system server and according to the determined EPT combination; and
invoke the acceptor mechanism to generate a protocol handler configured to handle a particular protocol of the incoming messages from among a plurality of message protocols supported by the remoting system server and according to the determined EPT combination;

wherein the generated protocol handler is further configured to invoke the acceptor mechanism to generate a decoder on the remoting system server configured to decode data of the incoming messages in accordance with a particular data encoding of the incoming message from among a plurality of data encodings supported by the remoting system server and according to the determined EPT combination, wherein the plurality of data encodings include eXtensible Markup Language (XML) data encoding and binary data encoding.

24. The system as recited in claim 23, wherein the remoting system server is implemented according to a Presentation, Encoding, Protocol, and Transport (PEPt) remoting architecture, wherein the decoder is part of an encoding block of the PEPt architecture, wherein the protocol handler is part of a protocol block of the PEPt architecture, and wherein the connection is part of a transport block of the PEPt architecture.

25. The system as recited in claim 23, wherein the acceptor mechanism is further configured to generate one or more of a different connection, a different protocol handler, and a different decoder on the remoting system server to handle other incoming messages according to a different EPT combination.

26. A method for automatically configuring a remoting system server to receive messages from remoting system clients according to particular ones of a plurality of Encoding, Protocol, and Transport (EPT) combinations, comprising:
advertising the plurality of EPT combinations for discovery by remoting system clients;
receiving a connection request from a remoting system client;
in response to the connection request, generating a connection configured to receive incoming messages from the remoting system client in accordance with a particular transport protocol of a plurality of transport protocols supported by the remoting system server and indicated by the connection request;
in response to the connection receiving an incoming message from the remoting system client:
determining a particular protocol of the incoming message from among a plurality of message protocols supported by the remoting system server;
generating a protocol handler configured to handle the determined protocol of the incoming message;
determining a particular data encoding of the incoming message from among a plurality of data encodings supported by the remoting system server, wherein the plurality of data encodings include eXtensible Markup Language (XML) data encoding and binary data encoding; and
generating a decoder configured to decode data of the incoming messages in accordance with the determined data encoding, wherein said generating a decoder comprises the protocol handler invoking an acceptor mechanism to generate the decoder.

27. The method as recited in claim 26, further comprising an acceptor mechanism generating the connection in response to receiving the connection request from the remoting system client.

28. The method as recited in claim 26, wherein said generating a protocol handler comprises the connection invoking an acceptor mechanism to generate the protocol handler.

29. The method as recited in claim 26, further comprising generating a specific encoder for transmitting response messages to the remoting system client in accordance with the determined data encoding.

30. The method as recited in claim 26, wherein the remoting system server is implemented according to a Presentation, Encoding, Protocol, and Transport (PEPt) remoting architecture, wherein the decoder is part of an encoding block of the PEPt architecture, wherein the protocol handler is part of a protocol block of the PEPt architecture, and wherein the connection is part of a transport block of the PEPt architecture.

31. The method as recited in claim 30, wherein the PEPt remoting architecture is implemented in a web container on the remoting system server.

32. The method as recited in claim 26, further comprising generating one or more of a different connection, a different protocol handler, and a different decoder on the remoting system server to handle other incoming messages according to a different EPT combination.

33. A method, comprising: advertising a plurality of distinct Encoding, Protocol, and Transport (EPT) combinations supported by a remoting system server for discovery by remoting system clients;
the remoting system server receiving a connection request from a remoting system client;
determining one of a plurality of distinct EPT combinations supported by the remoting system server for receiving one or more messages from the remoting system client in response to said connection request;
generating, according to the determined EPT combination a specific connection according to a particular transport protocol from among a plurality of transport protocols supported by the remoting system server and a specific protocol handler according to a particular message protocol from among a plurality of message protocols supported by the remoting system server; in response to invocation by the protocol handler, generating a specific decoder according to a particular data encoding from among a plurality of data encodings supported by the remoting system server, wherein the plurality of data encodings include eXtensible Markup Language (XML) data encoding and binary data encoding; and
the remoting system server receiving the one or more messages from the remoting system client in accordance with the generated specific connection, protocol handler, and decoder.

34. The method as recited in claim 33, wherein the remoting system server is implemented according to a Presentation, Encoding, Protocol, and Transport (PEPt) remoting architecture, wherein the decoder is part of an encoding block of the PEPt architecture, wherein the protocol handler is part of a protocol block of the PEPt architecture, and wherein the connection is part of a transport block of the PEPt architecture.

35. The method as recited in claim 33, further comprising generating a specific encoder for transmitting one or more messages to the remoting system client in response to the one or more received messages.

36. The method as recited in claim 33, wherein the remoting system server is implemented according to a Presentation, Encoding, Protocol, and Transport (PEPt) remoting architecture.

37. The method as recited in claim 33, further comprising:
the remoting system server receiving another connection request from a different remoting system client;
determining a different one of the plurality of EPT combinations supported by the remoting system server for receiving one or more messages from the different remoting system client in response to the other connection request;
generating a different connection protocol handler and decoder according to the determined different EPT combination to receive the one or more messages from the different remoting system client; and
the remoting system server receiving the one or more messages from the different remoting system client according to the different EPT combination.

38. A computer-accessible storage medium, comprising program instructions, wherein the program instructions are computer-executable to implement: advertising a plurality of Encoding, Protocol, and Transport (EPT) combinations for discovery by remoting system clients;
receiving a connection request from a remoting system client;
in response to the connection request, generating a connection configured to receive incoming messages from the remoting system client in accordance with a particular transport protocol of a plurality of transport protocols supported by the remoting system server and indicated by the connection request;
in response to the connection receiving an incoming message from the remoting system client:
determining a particular protocol of the incoming message from among a plurality of message protocols supported by the remoting system server;
generating a protocol handler configured to handle the determined protocol of the incoming message;
determining a particular data encoding of the incoming message from among a plurality of data encodings supported by the remoting system server wherein the plurality of data encodings include eXtensible Markup Language (XML) data encoding and binary data encoding; and
generating a decoder configured to decode data of the incoming messages in accordance with the determined data encoding wherein, in said generating a decoder, the program instructions are further computer-executable to implement the protocol handler invoking an acceptor mechanism to generate the decoder.

39. The computer-accessible storage medium as recited in claim 38, wherein the program instructions are further computer-executable to implement the acceptor mechanism generating the connection in response to receiving the connection request from the remoting system client.

40. The computer-accessible storage medium as recited in claim 38, wherein, in said generating a protocol handler, the program instructions are further computer-executable to implement the connection invoking the acceptor mechanism to generate the protocol handler.

41. The computer-accessible storage medium as recited in claim 38, wherein the program instructions are further computer-executable to implement generating a specific encoder for transmitting response messages to the remoting system client in accordance with the determined data encoding.

42. The computer-accessible storage medium as recited in claim 38, wherein the remoting system server is implemented according to a Presentation, Encoding, Protocol, and Transport (PEPt) remoting architecture, wherein the decoder is part of an encoding block of the PEPt architecture, wherein the protocol handler is part of a protocol block of the PEPt architecture, and wherein the connection is part of a transport block of the PEPt architecture.

43. The computer-accessible storage medium as recited in claim 42, wherein the PEPt remoting architecture is implemented in a web container on the remoting system server.

44. The computer-accessible storage medium as recited in claim 38, wherein the program instructions are further computer-executable to implement generating one or more of a different connection, a different protocol handler, and a different decoder on the remoting system server to handle other incoming messages according to a different EPT combination.

45. A computer-accessible storage medium, comprising program instructions, wherein the program instructions are computer-executable to implement: advertising a plurality of distinct Encoding, Protocol, and Transport (EPT) combinations supported by a remoting system server for discovery by remoting system clients;
 the remoting system server receiving a connection request from a remoting system client;
 determining one of the plurality of distinct EPT combinations supported by the remoting system server for receiving one or more messages from the remoting system client in response to said connection request;
 generating, according to the determined EPT combination, a specific connection according to a particular transport protocol from among a plurality of transport protocols supported by the remoting system server and a specific protocol handler according to a particular message protocol from among a plurality of message protocols supported by the remoting system server; in response to invocation by the protocol handler, generating a specific decoder according to a particular data encoding from among a plurality of data encodings supported by the remoting system server, wherein the plurality of data encodings include eXtensible Markup Language (XML) data encoding and binary data encoding; and
 the remoting system server receiving the one or more messages from the remoting system client in accordance with the generated specific connection protocol handler and decoder.

46. The computer-accessible storage medium as recited in claim 45, wherein the remoting system server is implemented according to a Presentation, Encoding, Protocol, and Transport (PEPt) remoting architecture, wherein the decoder is part of an encoding block of the PEPt architecture, wherein the protocol handler is part of a protocol block of the PEPt architecture, and wherein the connection is part of a transport block of the PEPt architecture.

47. The computer-accessible storage medium as recited in claim 45, wherein the program instructions are further computer-executable to implement generating a specific encoder for transmitting one or more messages to the remoting system client in response to the one or more received messages.

48. The computer-accessible storage medium as recited in claim 45, wherein the remoting system server is implemented according to a Presentation, Encoding, Protocol, and Transport (PEPt) remoting architecture.

49. The computer-accessible storage medium as recited in claim 45, wherein the program instructions are further computer-executable to implement:
 the remoting system server receiving another connection request from a different remoting system client;
 determining a different one of the plurality of EPT combinations supported by the remoting system server for receiving one or more messages from the different remoting system client in response to the other connection request;
 generating a different connection protocol handler and decoder according to the determined different EPT combination to receive the one or more messages from the different remoting system client; and
 the remoting system server receiving the one or more messages from the different remoting system client according to the different EPT combination.

50. A remoting system server, comprising: processor;
 means for advertising a plurality of distinct Encoding, Protocol, and Transport (EPT) combinations supported by a remoting system server for discovery by remoting system clients; means for determining one of the plurality of EPT combinations supported by the remoting system server for receiving one or more messages from a remoting system client;
 means for generating a specific connection according to a particular transport protocol from among a plurality of transport protocols supported by the remoting system server and a specific protocol handler according to a particular message protocol from among a plurality of message protocols supported by the remoting system server means for generating, in response to invocation by the protocol handler, a specific decoder according to a particular data encoding from among a plurality of data encodings supported by the remoting system server to receive the one or more messages from the remoting system client according to the determined EPT combination, wherein the plurality of data encodings include eXtensible Markup Language (XML) data encoding and binary data encoding.

51. The remoting system server as recited in claim 50, further comprising means for switching to a different EPT combination to receive one or more other messages from the remoting system client.

52. A system, comprising:
 a processor; and
 a memory comprising program instructions, wherein the program instructions are executable by the processor to implement a remoting system server configured to:
  advertise a plurality of Encoding, Protocol, and Transport (EPT) combinations supported by the remoting system server;
  generate according to a specific EPT combination of the plurality of EPT combinations supported by the remoting system server, a specific connection according to a particular transport protocol from among a plurality of transport protocols supported by the remoting system server and a specific protocol handler according to a particular message protocol from among a plurality of message protocols supported by the remoting system server in response to invocation by the protocol handler, generate a specific decoder according to a particular data encoding from among a plurality of data encodings supported by the remoting system server to receive one or more messages from a remoting system client according to the specific EPT combination, wherein the plurality of data encodings include eXtensible Markup Language (XML) data encoding and binary data encoding;
  determine a different one of the plurality of EPT combinations to receive a different one or more messages, wherein only the Encoding part of the EPT combination is different from the original EPT combination implemented on the remoting system server; and
  generate a different decoder to receive the different messages without affecting the original protocol handler and connection.

53. The system as recited in claim 52, wherein the program instructions are further executable by the processor to implement the remoting system server according to a Presentation, Encoding, Protocol, and Transport (PEPt) remoting architecture, wherein the decoder is part of an encoding block of the PEPt architecture, wherein the protocol handler is part of a protocol block of the PEPt architecture, and wherein the connection is part of a transport block of the PEPt architecture.

54. A system, comprising:

a processor; and a memory comprising program instructions, wherein the program instructions are executable by the processor to implement a remoting system server configured to:

advertise a plurality of Encoding, Protocol, and Transport (EPT) combinations supported by the remoting system server;

generate according to a specific EPT combination of the plurality of EPT combinations supported by the remoting system server, a specific connection according to a particular transport protocol from among a plurality of transport protocols supported by the remoting system server and a specific protocol handler according to a particular message protocol from among a plurality of message protocols supported by the remoting system server in response to invocation by the protocol handler, generate a specific decoder according to a particular data encoding from among a plurality of data encodings supported by the remoting system server to receive one or more messages from a remoting system client according to the specific EPT combination, wherein the plurality of data encodings include eXtensible Markup Language (XML) data encoding and binary data encoding;

determine a different one of the plurality of EPT combinations to receive a different one or more messages, wherein only the Protocol part of the EPT combination is different from the original EPT combination implemented on the remoting system server; and generate a different protocol handler to receive the different messages without affecting the original decoder and connection.

55. The system as recited in claim 54, wherein the program instructions are further executable by the processor to implement the remoting system server according to a Presentation, Encoding, Protocol, and Transport (PEPt) remoting architecture, wherein the decoder is part of an encoding block of the PEPt architecture, wherein the protocol handler is part of a protocol block of the PEPt architecture, and wherein the connection is part of a transport block of the PEPt architecture.

56. A system, comprising:

a processor; and a memory comprising program instructions, wherein the program instructions are executable by the processor to implement a remoting system server configured to:

advertise a plurality of Encoding, Protocol, and Transport (EPT) combinations supported by the remoting system server;

generate, according to a specific EPT combination of the plurality of EPT combinations supported by the remoting system server, a specific connection according to a particular transport protocol from among a plurality of transport protocols supported by the remoting system server and a specific protocol handler according to a particular message protocol from among a plurality of message protocols supported by the remoting system server in response to invocation by the protocol handler, generate a specific decoder according to a particular data encoding from among a plurality of data encodings supported by the remoting system server to receive one or more messages from a remoting system client according to the specific EPT combination, wherein the plurality of data encodings include eXtensible Markup Language (XML) data encoding and binary data encoding;

determine a different one of the plurality of EPT combinations to receive a different one or more messages, wherein only the Transport part of the EPT combination is different from the original EPT combination implemented on the remoting system server; and generate a different connection to receive the different messages without affecting the original protocol handler and decoder.

57. The system as recited in claim 56, wherein the program instructions are further executable by the processor to implement the remoting system server according to a Presentation, Encoding, Protocol, and Transport (PEPt) remoting architecture, wherein the decoder is part of an encoding block of the PEPt architecture, wherein the protocol handler is part of a protocol block of the PEPt architecture, and wherein the connection is part of a transport block of the PEPt architecture.

* * * * *